US010423598B2

(12) United States Patent
Auvenshine et al.

(10) Patent No.: US 10,423,598 B2
(45) Date of Patent: Sep. 24, 2019

(54) OPTIMIZED ORCHESTRATION OF DATA-MIGRATION PROJECTS WITH SOFT MIGRATION COSTS BASED ON FILE-SPECIFIC MIGRATION FEASIBILITIES

(71) Applicant: International Business Machines Corporation, Armonk, NY (US)

(72) Inventors: John J. Auvenshine, Tucson, AZ (US); Bernhard J. Klingenberg, Grover Beach, CA (US); Sunhwan Lee, Menlo Park, CA (US); James E. Olson, Seymour, CT (US); Mu Qiao, Belmont, CA (US); Ramani R. Routray, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 15/291,339

(22) Filed: Oct. 12, 2016

(65) Prior Publication Data
US 2018/0103084 A1     Apr. 12, 2018

(51) Int. Cl.
*G06F 16/22*     (2019.01)
*H04L 29/08*     (2006.01)
*G06F 16/215*    (2019.01)

(52) U.S. Cl.
CPC ........ *G06F 16/2246* (2019.01); *G06F 16/215* (2019.01); *H04L 67/10* (2013.01)

(58) Field of Classification Search
CPC ......... G06F 17/30327; G06F 17/30303; H04L 67/10
See application file for complete search history.

(56) References Cited

U.S. PATENT DOCUMENTS 8,819,672 B2 *  8/2014  Joukov ............... G06F 8/63
                                           709/201
9,619,492 B2 *  4/2017  Gao ................. G06F 17/303
(Continued)

FOREIGN PATENT DOCUMENTS

WO     WO 2012126089      9/2012

OTHER PUBLICATIONS

Rubner et al., The earth mover's distance as a metric for image retrieval, International Journal of Computer Vision, 40(2), 99-121 (2000), Retrieved from Internet: http://robotics.stanford.edu/~rubner/papers/rubnerljcv00.pdf, 23 pages.
(Continued)

*Primary Examiner* — Philip J Chea
*Assistant Examiner* — Robert B McAdams
(74) *Attorney, Agent, or Firm* — Schmeiser, Olsen & Watts; Michael A. Petrocelli

(57) ABSTRACT

A method and associated systems for optimized orchestration of a data-migration project. A data-migration orchestration system represents a hierarchical organization of each dataset to be migrated as a tree, where each leaf node of the tree represents data to be migrated and where a path between the leaf node and the root node represents a hierarchical directory pathname of sensitive data represented by the leaf node. Each tree is assigned a sensitivity signature that is proportional to the relative sensitivity and access frequency of the dataset represented by that tree. The signatures are organized into clusters as a function of the distances between each signature, and each signature is associated with a soft migration cost specific to that signature's cluster. A soft cost for migrating an application that requires multiple datasets may be determined by adding the migration costs associated with each of the multiple datasets.

19 Claims, 7 Drawing Sheets

(56) References Cited

U.S. PATENT DOCUMENTS

| | | | |
|---|---|---|---|
| 2005/0160399 A1* | 7/2005 | Kumar | G06F 8/36 |
| | | | 717/104 |
| 2008/0270515 A1* | 10/2008 | Chen | G06F 9/4856 |
| | | | 709/202 |
| 2011/0010343 A1 | 1/2011 | Chavda et al. | |
| 2015/0264128 A1 | 9/2015 | Huang et al. | |
| 2015/0341240 A1 | 11/2015 | Iyoob et al. | |

OTHER PUBLICATIONS

C. L. Mallows, A note on asymptotic joint normality, Annals of Mathematical Statistics, 43(2), 508-515 (1972), Retrieved from Internet: http://projecteuclid.org/download/pdf_1/euclid.aoms/1177692631, 8 pages.

* cited by examiner

OPTIMIZED ORCHESTRATION OF DATA-MIGRATION PROJECTS WITH SOFT MIGRATION COSTS BASED ON FILE-SPECIFIC MIGRATION FEASIBILITIES

BACKGROUND

The present invention relates to the operation of automated systems that orchestrate the migration of computer-systems from one site or platform to another, and relates in particular to the orchestration of the data-migration portion of such migrations.

Migrating a set of computer resources, such as a data center or a set of Information Technology services used by a business function, may comprise moving large amounts of data, applications, volumes of storage, and other business elements from one physical or logical location to another. A data-migration portion of a system migration might, for example, comprise relocating employee data from the employees' notebook computers to a cloud-computing platform, moving data from one server farm to a second set of servers located in a different city, or migrating large transaction-processing systems from a physical infrastructure to a hosted Infrastructure-as-a-Service cloud platform.

These migration efforts may be very complex, requiring a migration-planning application or tool to schedule resources, estimate hard costs, and generate project plans. One such class of automated tools is known in the industry as an orchestration mechanism. In a migration, orchestration may comprise the automated organization, scheduling, and management of computer systems, middleware and services before and during the actual migration process. In particular, orchestrating a migration effort may comprise: selecting and organizing tools, procedures, and architectural features required to perform required migration services; assembling and coordinating software and hardware components necessary to perform required migration services; and automating workflows necessary to deliver the required migration services.

For example, an orchestration mechanism might, in response to receiving information about a set of computing resources to be migrated, identify each migration service to be performed, determine the expense and time required to perform each migration service, select and organize the software and hardware components and resources required to perform each migration service, and then automating workflows required to deliver each migration service.

Today's system-migration orchestration mechanisms do a good job of estimating hard costs associated a migration, such as hardware purchase prices and software installation costs, especially when those hard costs are input by a user. They cannot, however, effectively estimate the feasibility of each migration subtask or the less-obvious "soft" costs associated with moving certain types of "hot" or sensitive data.

If, for example, government regulations or industry conventions require that enhanced security procedures be implemented to move a volume of sensitive data, the additional cost, resources, or time required for compliance is beyond the scope of existing data-migration orchestration tools. In another example, extrinsic or internal considerations may render some data infeasible to move, such as confidential medical records that are legally barred from being migrated to a lightly secured cloud platform. When "hot" data is frequently updated, additional expense may be incurred by additional tasks needed to ensure that the data remains current during the migration process. And if sensitive data is mingled with more readily movable data, such as when personal and business data coexist on a user's laptop hard drive, the hard drive may need to be "sanitized" by eliminating sensitive personal data prior to migration.

These problems are particularly significant in complex, large-scale migrations, where soft costs may comprise a large portion of total project costs, and where it is determined that a significant amount of data cannot be feasibly migrated. Current orchestration tools and applications thus fail to provide a nuanced, accurate estimate of the costs, resources, and time required to perform many migrations.

There is therefore a need for a way to improve migration-orchestration technologies to solve this technical problem in order to properly account for soft migration costs and infeasibilities.

BRIEF SUMMARY

One embodiment of the present invention provides a data-migration orchestration system comprising a processor, a memory coupled to the processor, one or more storage-management mechanisms capable of migrating data from a source computing environment to a target computing environment, and a local computer-readable hardware storage device coupled to the processor, the local storage device containing program code configured to be run by the processor via the memory to implement a method for optimized orchestration of a data-migration project, the method comprising:

constructing a set of weighted tree structures that each represent a dataset of a set of stored datasets capable of being migrated by the one or more storage-management mechanisms from the source computing environment to the target computing environment, where each application of a set of applications to be migrated requires data comprised by a corresponding subset of the set of datasets, where a first application of the set of applications requires data comprised by a first subset of the set of datasets, where a first dataset of the first subset is represented by a root node of a first tree of the set of weighted tree structures where a first internal node of the first tree represents a first data folder comprised by the first dataset and a child node of the first internal node represents a second data folder comprised by the first data folder, where a first leaf node of the first tree is associated with a first weight that is proportional to a first quantity of sensitive data represented by the first leaf node, and where the first leaf node is associated further with a first path depth that is proportional to a length of a path from the root node to the first leaf node;

identifying a sensitivity signature for each tree of the set of weighted tree structures, where a first sensitivity signature of the first tree comprises a set of ordered pairs that each uniquely characterize a corresponding leaf node of the first tree, and where a first ordered pair of the first sensitivity signature characterizes the first leaf node and comprises the first weight and the first path depth;

computing a distance between each pair of identified sensitivity signatures;

grouping the computed sensitivity signatures into a set of clusters as a function of the determined distances;

associating each cluster of the set of clusters with a centroid sensitivity signature; and calculating a soft data-migration cost for the first application as a function of all sensitivity signatures associated with the first subset of the set of datasets.

Another embodiment of the present invention provides a method for optimized orchestration of a data-migration project, the method comprising:

constructing a set of weighted tree structures that each represent a dataset of a set of stored datasets capable of being migrated by one or more storage-management mechanisms from a source computing environment to a target computing environment, where each application of a set of applications to be migrated requires data comprised by a corresponding subset of the set of datasets, where a first application of the set of applications requires data comprised by a first subset of the set of datasets, where a first dataset of the first subset is represented by a root node of a first tree of the set of weighted tree structures where a first internal node of the first tree represents a first data folder comprised by the first dataset and a child node of the first internal node represents a second data folder comprised by the first data folder, where a first leaf node of the first tree is associated with a first weight that is proportional to a first quantity of sensitive data represented by the first leaf node, and where the first leaf node is associated further with a first path depth that is proportional to a length of a path from the root node to the first leaf node;

identifying a sensitivity signature for each tree of the set of weighted tree structures, where a first sensitivity signature of the first tree comprises a set of ordered pairs that each uniquely characterize a corresponding leaf node of the first tree, and where a first ordered pair of the first sensitivity signature characterizes the first leaf node and comprises the first weight and the first path depth;

computing a distance between each pair of identified sensitivity signatures;

grouping the computed sensitivity signatures into a set of clusters as a function of the determined distances;

associating each cluster of the set of clusters with a centroid sensitivity signature;

calculating a soft data-migration cost for the first application as a function of all sensitivity signatures associated with the first subset of the set of datasets; and migrating, by the one or more storage-management mechanisms, datasets of the set of datasets from the source computing environment to the target computing environment in order of increasing soft data-migration costs calculated for each dataset.

Yet another embodiment of the present invention provides computer program product, comprising a computer-readable hardware storage device having a computer-readable program code stored therein, the program code configured to be executed by a migration-orchestration system comprising a processor, a memory coupled to the processor, and a computer-readable hardware storage device coupled to the processor, the storage device containing program code configured to be run by the processor via the memory to implement a method for optimized orchestration of a data-migration project, the method comprising:

constructing a set of weighted tree structures that each represent a dataset of a set of stored datasets capable of being migrated by one or more storage-management mechanisms from a source computing environment to a target computing environment, where each application of a set of applications to be migrated requires data comprised by a corresponding subset of the set of datasets, where a first application of the set of applications requires data comprised by a first subset of the set of datasets, where a first dataset of the first subset is represented by a root node of a first tree of the set of weighted tree structures where a first internal node of the first tree represents a first data folder comprised by the first dataset and a child node of the first internal node represents a second data folder comprised by the first data folder, where a first leaf node of the first tree is associated with a first weight that is proportional to a first quantity of sensitive data represented by the first leaf node, and where the first leaf node is associated further with a first path depth that is proportional to a length of a path from the root node to the first leaf node;

identifying a sensitivity signature for each tree of the set of weighted tree structures, where a first sensitivity signature of the first tree comprises a set of ordered pairs that each uniquely characterize a corresponding leaf node of the first tree, and where a first ordered pair of the first sensitivity signature characterizes the first leaf node and comprises the first weight and the first path depth;

computing a distance between each pair of identified sensitivity signatures;

grouping the computed sensitivity signatures into a set of clusters as a function of the determined distances;

associating each cluster of the set of clusters with a centroid sensitivity signature;

calculating a soft data-migration cost for the first application as a function of all sensitivity signatures associated with the first subset of the set of datasets; and migrating, by the one or more storage-management mechanisms, datasets of the set of datasets from the source computing environment to the target computing environment in order of increasing soft data-migration costs calculated for each dataset.

DETAILED DESCRIPTION

Figure 1:
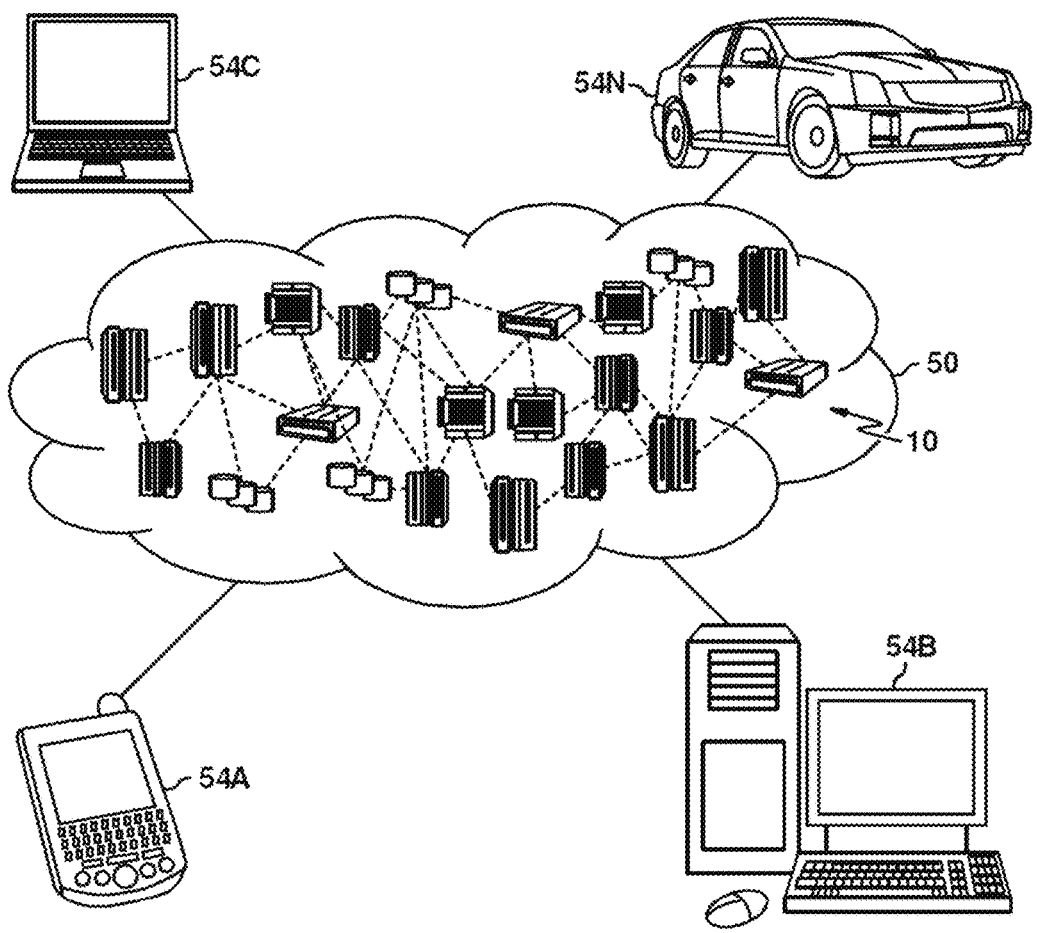
FIG. 1 depicts a cloud computing environment according to an embodiment of the present invention.

The present invention comprises systems and methods for increasing the efficiency of automated orchestration of data-migration projects. It enhances data-migration orchestration mechanisms by considering feasibilities and soft costs associated with each migration service comprised by an overall data-migration project. In some embodiments, the present invention may be packaged as an internal software module, plug-in, or other software enhancement to an existing orchestration mechanism and in other embodiments, the invention may be configured as an independent software module that interacts with an orchestration mechanism.

Existing orchestration mechanisms cannot accurately forecast feasibilities and soft costs associated with the enormous number of individual data-migration services comprised by a large-scale migration effort. Instead, current mechanisms either ignore these important factors, set them to arbitrary or predefined values, or merely guess at their effect. Embodiments of the present invention thus provide a technical solution to a technical problem rooted in automated migration-support systems such as cloud-orchestration applications.

Migration is the process of moving computer systems, infrastructure, data, applications or other business elements from one site or platform to another. One type of migration is a cloud migration, where an organization's computing resources are moved from a physical installation to a cloud-computing platform, or are moved from one cloud environment to another.

A major component of most migrations is the task of migrating data (or, optionally, software applications) associated with migrated computer systems or with users of those systems. A data-migration project may comprise moving a variety of software business elements, such as databases, applications, disk volumes and folders, or virtual machines and virtualized infrastructure. Embodiments and examples described in this document may define a business element even more broadly, so as comprise all software associated with an entire business function or department, a workgroup or other group of employees, a certain class of user, a data center or other physical site, resources served by a particular network segment or local-area network, a logical subset of a virtual infrastructure, or any other entity that may characterize or bound business-element data to be migrated.

For example, a data-migration effort might comprise migrating an Engineering Department's employee data from several thousand employee desktop computers to virtual machines of a cloud-computing platform; moving data residing on a first server farm to a second set of servers physically installed in a different building; or migrating data stored at data centers located throughout a certain geographical region from physical infrastructure to a hosted cloud platform.

A threshold step necessary to orchestrate a data-migration effort is to perform a migration-readiness assessment that identifies which business elements can feasibly be migrated and which delivery methods are capable of being used for each element to be migrated. When migrating to a cloud platform, for example, an orchestration mechanism may need to recognize that certain highly sensitive data elements cannot be delivered to certain types of public, private, or hybrid cloud environments. The orchestration mechanism may also need to identify that certain data elements should not be migrated through unsecured electronic channels or in unencrypted form. Current migration-orchestration systems are not capable of making such determinations, which may require a greater understanding of extrinsic factors than is possible for a simple migration tool.

In one example, a migration project may comprise a migration-readiness assessment that characterizes certain data elements to be migrated, such as a volume, folder, or file, as being relatively "hot" or "cold." Such a "hot/cold" characterization is common in the information technology industry, and identifies how often an element of data is expected to be accessed. A relative "hot/cold" characterization may be subjective, set by a business in order to identify a relative "hotness" of the business's data. For example, a business might deem constantly updated employee-pay records to be hotter than older, warehoused employee time sheets. Moreover, many current software tools and applications, including existing orchestration applications, automatically quantify a relative hotness of a data element as a function of the frequency at which the data element is updated. In either case, deeming a data element as being hot or cold is a task that is known in the art, and that can also be performed either by automated orchestration software or as a business's ad hoc determination by a person with expert knowledge of the business's priorities and goals.

A business might also determine that data currently stored in encrypted form in a restricted-access database should be deemed to be more "sensitive" than publicly accessible data capable of being stored in unencrypted form on the business's public Web site. Here, "sensitivity" refers to a degree of security or privacy necessary when storing, migrating, or handling the data. For example, a company's unpublished current-year financial records might be deemed to be more sensitive than its previously published financial reports. Like determinations of relative hotness, determinations of sensitivity may be made by any person skilled in the art who possesses expert knowledge of the business's priorities, business goals, or internal practices. Furthermore, many software applications in the art are capable of identifying sensitive data as a function of government regulations, generally accepted industry best practices, or other conventions or standards.

Because each business is uniquely qualified to identify the characteristics and relative importance of its data assets, using whatever criteria the business believes is appropriate, embodiments of the present invention do not attempt to identify whether a data item is relatively hot or cold, or is relatively sensitive or nonsensitive. Instead, embodiments receive these identifications as input values determined by the business that owns, manages, uses, or otherwise controls the data to be migrated.

The relative hotness or sensitivity of any particular data element can affect the feasibility or soft costs associated with migrating that element. For example, regulatory issues or a business's best practices may bar migrating sensitive data stored at a secured location; or a business's internal policies may bar migrating extremely hot mission-critical data that is continuously updated by thousands of users scattered across the world. In other cases, it may be permitted to migrate certain hot or sensitive hot data be migrated, but only when that migration comprises additional, cost-invoking, security or backup measures.

Furthermore, when a particular volume (or other unit of stored data) comprises both hot and cold data, or comprises both sensitive and nonsensitive data, it may be necessary to "sanitize" that volume prior to migration by removing any information that the business deems infeasible or too expensive to migrate safely, legally, ethically, or cost-effectively. This is especially true of businesses that are subject to government regulation, such as defense contractors, or that must comply with ethical standards, like legal firms, healthcare providers, accountants, and architects. In particular, feasibility issues may arise when migrating data to a cloud platform, where it is sometimes impossible to implement or adequately manage security and privacy controls.

When sanitization is required, more sensitive or hotter data may be isolated and then independently migrated to a distinct, properly secured location, or even deleted. The remaining data can then be more easily, efficiently, and cost-effectively migrated. Unlike known migration-planning and orchestration tools, embodiments of the present invention are sophisticated enough to identify and account for sanitization costs.

Each element of data may be associated with hard costs and soft costs. A hard cost is an expense associated with procuring, configuring, or deploying physical assets required by a migration, such as servers, disks, virtualized resources, and network infrastructure. Existing migration-planning and orchestration systems can generally identify hard costs by means known in the art, such as by retrieving hardware purchase costs in vendor price catalogs or by using historical records to estimate the cost to install a software application.

Soft costs, on the other hand, are incurred by tasks related to risk mitigation and compliance with regulations, conventions, and standards related to data confidentiality, security, and privacy. For example, a soft cost might be incurred by sanitization or backup requirements necessitated by government regulations, user privacy concerns, a business's internal design-governance policies, or the need to plan and test risk-mitigation strategies. Other soft costs may comprise a cost to split sensitive from non-sensitive data during a sanitization procedure, a cost to provide a robust data-updating mechanism when migrating hot data, a cost to determine the feasibility of migrating confidential records to a less secure destination, or a cost of ensuring the security of sensitive data after migration.

Although infeasibility problems and soft migration costs can significantly increase the cost of a data-migration effort, these problems and costs are generally less visible and harder to predict than are hard costs. While it may be possible to estimate hard costs as a function of factors like current and projected storage requirements, there are no similar parameters that would allow automated migration and orchestration tools to straightforwardly project soft costs. Existing applications thus generally cannot identify or estimate soft costs and infeasibilities through conventional means, forcing a business to merely guess at the additional costs incurred by migrating sensitive or hot data.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
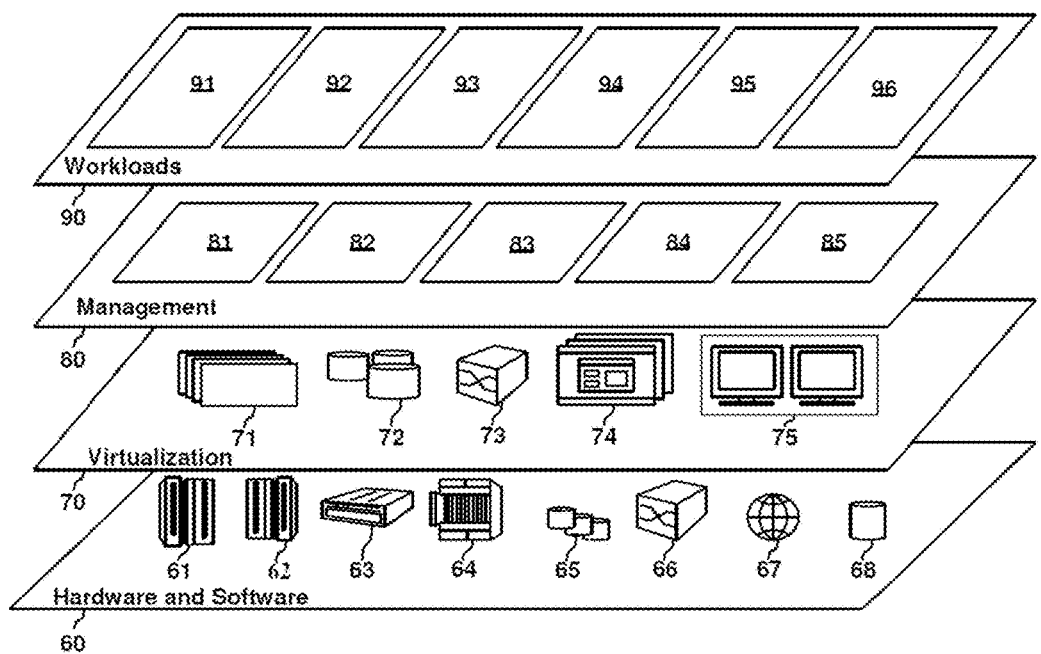
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of data-migration projects 96.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
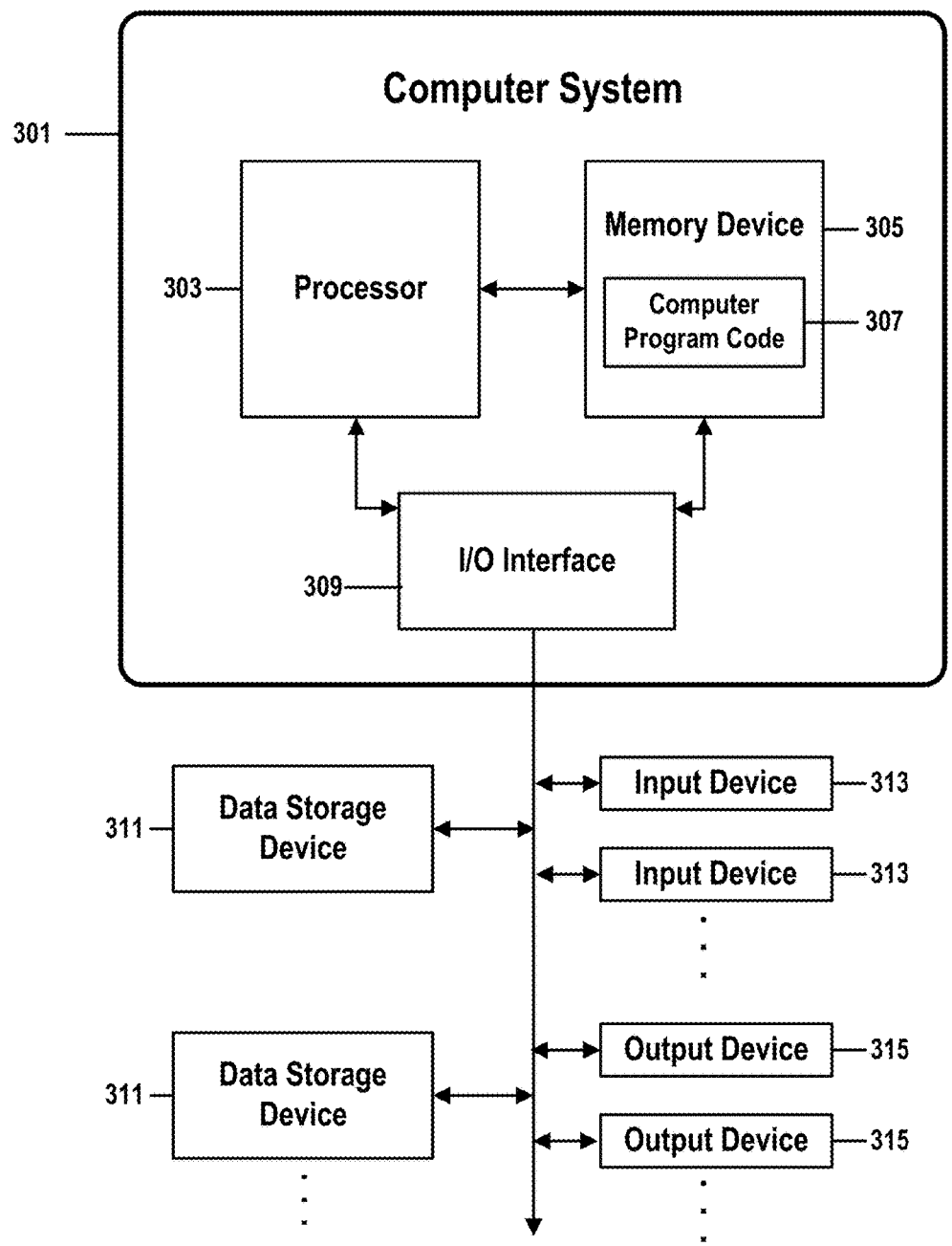
FIG. 3 shows the structure of a computer system and computer program code that may be used to implement a method for optimized orchestration of data-migration projects with soft migration costs based on file-specific migration feasibilities in accordance with embodiments of the present invention.

FIG. 3 shows a structure of a computer system and computer program code that may be used to implement a method for optimized orchestration of data-migration projects with soft migration costs based on file-specific migration feasibilities in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for optimized orchestration of data-migration projects with soft migration costs based on file-specific migration feasibilities in accordance with embodiments of the present invention, and may implement other embodiments described in this specification, including the methods illustrated in FIGS. 1-7. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware 305, or may be accessed by processor 303 directly from such firmware 305, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for optimized orchestration of data-migration projects with soft migration costs based on file-specific migration feasibilities.

Any of the components of the present invention could be created, integrated, hosted, maintained, deployed, managed, serviced, supported, etc. by a service provider who offers to facilitate a method for optimized orchestration of data-migration projects with soft migration costs based on file-specific migration feasibilities. Thus the present invention discloses a process for deploying or integrating computing infrastructure, comprising integrating computer-readable code into the computer system 301, wherein the code in combination with the computer system 301 is capable of performing a method for optimized orchestration of data-migration projects with soft migration costs based on file-specific migration feasibilities.

One or more data storage units 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

While it is understood that program code 307 for a method for optimized orchestration of data-migration projects with soft migration costs based on file-specific migration feasibilities may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for optimized orchestration of data-migration projects with soft migration costs based on file-specific migration feasibilities is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiment of the present invention may comprise functionality of an orchestration mechanism, such as an automated cloud-orchestration system. When orchestrating a data-migration task, this functionality may be implemented by means of computer software or code 307, storage controllers or other interfaces 309, and associated middleware required to migrate data stored on a first set of storage devices 311 to a second set of storage devices 311.

Embodiments of the present invention may be implemented as a method performed by a processor of a computer system, as a computer program product, as a computer system, or as a processor-performed process or service for supporting computer infrastructure.

Figure 4:
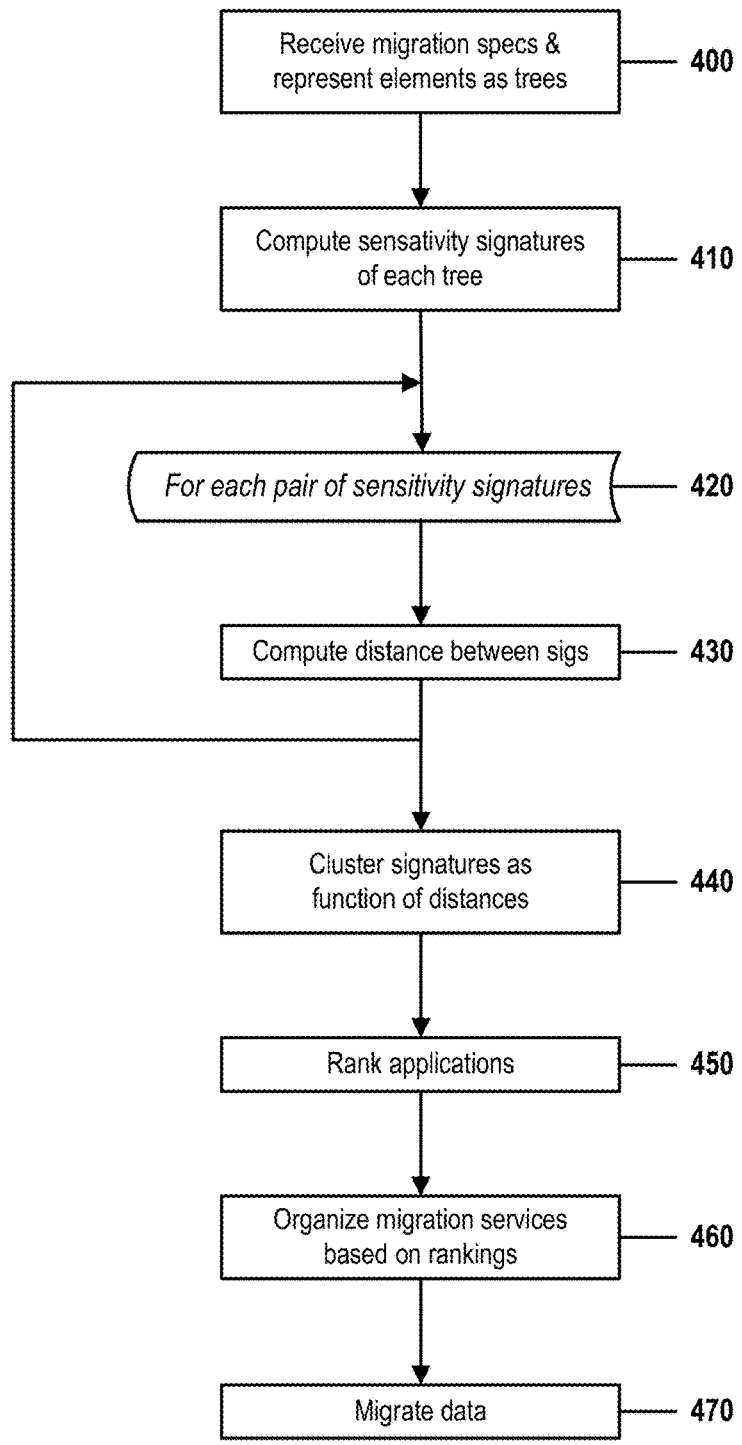
FIG. 4 is a flow chart that illustrates the steps of a method for optimized orchestration of data-migration projects with soft migration costs based on file-specific migration feasibilities, in accordance with embodiments of the present invention.

FIG. 4 is a flow chart that illustrates steps of a method for optimized orchestration of data-migration projects with soft migration costs based on file-specific migration feasibilities, in accordance with embodiments of the present invention. FIG. 4 contains steps 400-470.

In step 400, a processor of a migration-orchestration system receives specifications of a data-migration project of the business and, in response, the orchestration system generates a set of hierarchical tree diagrams that each represents a business element to be migrated. These specifications may be received by means of user input, transmitted from a business or other user that owns, manages, or otherwise controls the data to be migrated, or from another interested party. The specifications may be received by any means known in the art, such as by receiving them through interactive user input, reading stored files, querying system configuration or log data, or by receiving a file transmitted through a communications link.

As described above, a business element represented by a tree may comprise any set of data that the business plans to migrate. Such a data set may, for example, comprise a combination of one or more databases, software applications, data required by or associated with one or more software applications, files, directories or folders, disk volumes, or other types of stored data.

In some embodiments, a business element may also be identified by an associated business function or organizational component of a business. For example, a business element may comprise some or all of the data or other software associated with: a business's help desk or customer-support operation; a suite of accounting applications used by the business's Accounting Department; a specific workgroup, product team, or other collection of employees; a set of users that share one or more characteristics; a data center or other physical site; computing resources served by a certain network backbone segment or local-area network; a subset of a virtual infrastructure; a cloud-based service, such a PaaS or IaaS; or any other logical, physical, or organizational entity that may characterize or bound a set of data to be migrated.

The received specifications may comprise:
  one or more identifications of data comprised by each business element to be moved, such as: a physical or virtual location of each component of each business element; a filename, pathname, folder identifier, volume name, or other identifier of each component of the element. These identifications may allow data elements to be organized into hierarchical data structures, such as a tree, a directed graph, or an undirected graph, where each hierarchical data structure may represent all or part of a business element;
  a relative degree of hotness of each component of each element. As described above, characterizing data as being relatively "hot" or "cold" may indicate how often the data is accessed, where data is considered to be hotter if it is accessed more frequently. The method by which a business determines whether each component of data is relatively hot or cold is of no concern to the present invention, which merely treats this information as input. Although it is possible for a business to successfully employ its own criteria for determining a relative hotness of a data item, these determinations may also be made by means of conventions known in the art. For example, several volumes of data may be ranked in increasing order of hotness as a direct function of the relative frequency with which each of the several volumes is accessed. In other cases, data may be organized into categories of relative hotness/coldness, where each category contains data that is accessed with a frequency that falls within a particular range. In yet other cases, a data-management, backup, data-recovery, or other software application may have automatically determined a relative hotness of a data item as a function of the known, standard conventions,
  a relative degree of sensitivity of each component of each element. As described above, characterizing data as being relatively "sensitive" or "nonsensitive" may indicate whether regulations, statutes, or government policies require the data to be provided special handling or other privacy or security measures. The method by which a business determines the degree of sensitivity of each component of data is of no concern to the present invention, which merely treats this information as input. Although it is possible for a business to employ its own criteria for determining a relative hotness of a data item, these determinations may also be made by means of regulations, statutes, ethical codes, or conventions known in the art. For example, an ethical requirement of the legal profession may require sensitive information protected by attorney/client privilege to be stored on a password-protected volume and to be transmitted in an encrypted format. Similarly, a contractual obligation or government regulation may require data that falls into certain security classifications to be subject to specific controls or security provisions. In some cases, sensitive data items may be sorted into multiple categories of relative sensitivity, as a function of either a business's internal policies, of conventions known in the art, or of any other criteria described above. Any of these sensitivity classifications may be performed automatically by application software, using any of the criteria discussed above or otherwise known in the art, or based on specific user input that identifies a sensitivity of a data item.
  a measure of the size of each component of each business element to be migrated. This measure may be as simple as a number of files comprised by each element or an amount of storage capacity required to store each element.

The processor then organizes the received information into a set of hierarchical tree or graph data structures that each represent one business element to be migrated.

Figure 5:
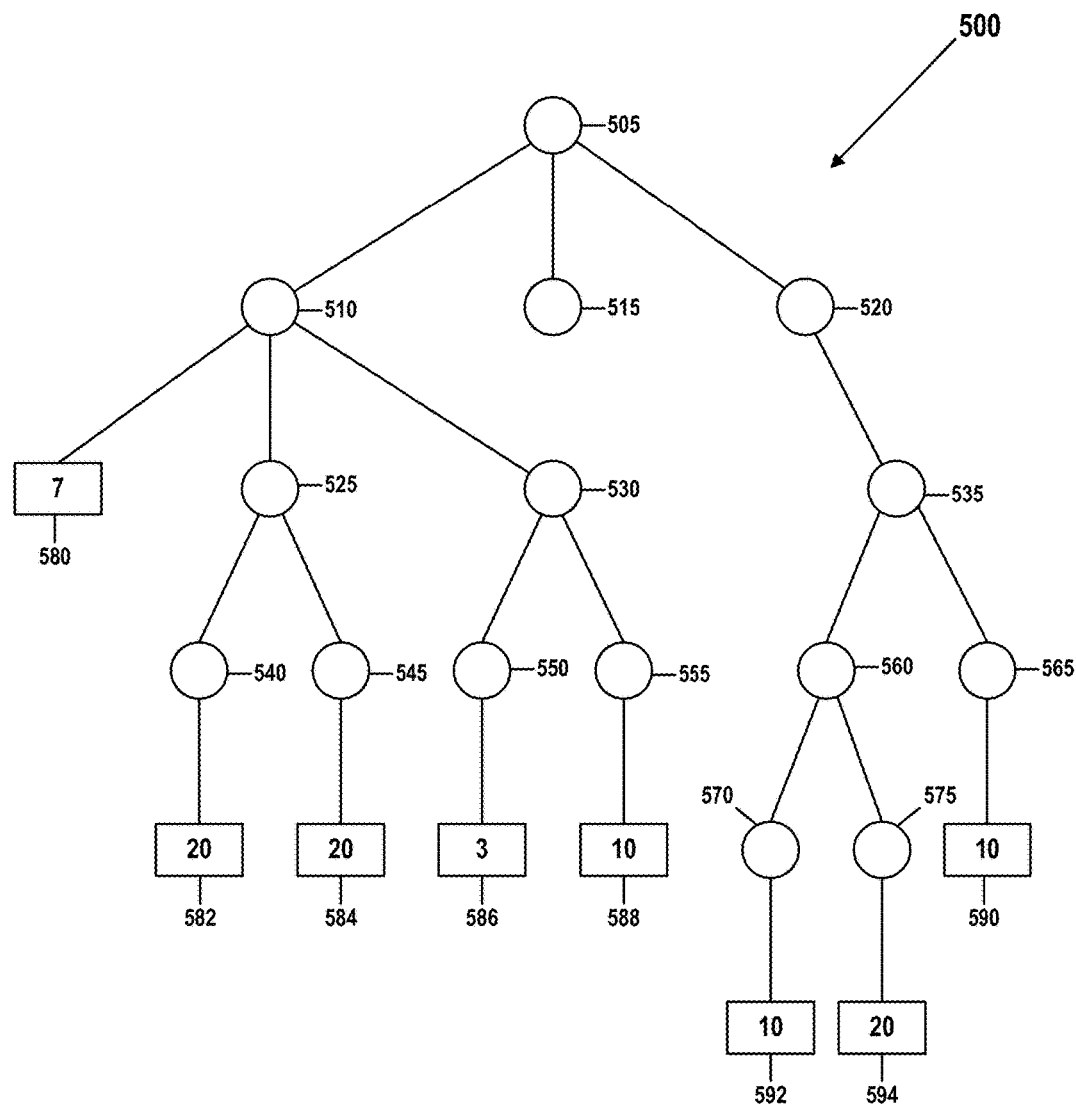
FIG. 5 shows an example of a hierarchical data structure constructed by embodiments of the present invention in order to represent a dataset to be migrated.

FIG. 5 is an example of one of these hierarchical graphs or trees, and represents a set of data components comprised by one business element. FIG. 5 comprises items 500-594.

Item 505 is the root of tree 500 and represents the root or highest-level storage component associated with the business element. Each leaf 580-594 represents one lowest-level component of the set of data items to be moved.

For example, if tree 500 represents a volume of data associated with a Marketing Department, root 505 may identify the entire volume and each leaf 580-594 may represent a database stored on the volume represented by 505.

A path from root 505 to any one leaf 580-594 represents a path from a root folder or highest-level storage component to a lowest-level component identified by the one leaf 580-594. For example, if tree 500 represents a volume of data identified by root 505, nodes 510, 515, and 520 may each represent a folder stored on volume 505. Nodes 525 and 530 each represent a subfolder of folder 510 and node 535 represents a subfolder of folder 520. Note that node 515 is not associated with any leaf node, representing that the folder or subfolder represented by node 515 does not contain any sensitive data.

Other internal nodes of tree 500 similarly represent folders, directories, volumes, or other organizations of data along paths of a folder hierarchy under root node 505. Nodes 540 and 545, for example, each represent a subfolder of the subfolder represented by node 525, nodes 550 and 555 each represent a subfolder of the subfolder represented by node 530, nodes 560 and 565 each represent a subfolder of the subfolder represented by node 535, and nodes 570 and 575 each represent a subfolder of the subfolder represented by node 560.

Similarly, each lowest-level component represented by a leaf 580-594 is stored in a folder, subfolder, or other organization of data represented by the leaf's parent node. In our previous example, a first database represented by leaf 580 would be contained within a subfolder represented by node 510, which would in turn be contained on the volume represented by node 505.

In our running example, the storage location of the database represented by leaf 588 may be identified by traversing a hierarchy of subfolders represented by nodes 555, 530, 510, and 505.

Each leaf 580-594 is associated with a weighting, number, or other measure that represents the size of the sensitive data stored in the leafs corresponding lowest-level component. As described above, this measure may, for example, identify an amount of storage space required to store the sensitive data, or it may identify a number of files, folders, applications, or other items comprised by the sensitive data. In examples and embodiments discussed in this document, a measure will be referred to as identifying a number of sensitive files. But this pedagogical device should not be construed to limit all embodiments of the invention to such a constraint.

In the ongoing example, the database represented by leaf 588 is labeled in FIG. 5 to indicate that the database comprises 10 units of sensitive material. In this example, a unit equates to ten gigabytes of storage capacity. Similarly, the database represented by leaf 594 can be seen to comprise 20 units of sensitive material.

Returning to FIG. 4, at the conclusion of step 400, the processors will have constructed a distinct tree similar to that of FIG. 5 for each business element to be migrated. This construction will have been enabled by the receipt of the identifications of a location of each business element and component, from which a storage hierarchy of each business element can be inferred; as well as a size, sensitivity, and relative heat of each data component of each business element.

In step 410, the processors compute a "sensitivity signature" for each tree constructed in step 400. A tree's sensitivity signature is set of ordered pairs that each correspond to one leaf of the tree. Each ordered pair consists of: i) the depth of a path (the number of nodes, including the root node) between the leaf node and the tree's root node; and ii) the number of units of sensitive data represented by the leaf node.

In the example of FIG. 5, computing a sensitivity signature for tree 500 would comprise the following steps:

Compute the total number of sensitive files comprised by the business element (identified by labels of leaf nodes 580-594)

7+20+20+3+10+10+10+20=100

Optionally normalize the numbers of sensitive files represented by each leaf by dividing each number of sensitive files by the previously computed total of all sensitive files. The resulting set of normalized weights will always sum to 1.0. Although step is not necessary, the embodiments and examples in this document will assume that this step has been performed.

(7/100)+(20/100)+(20/100)+(3/100)+(10/100)+(10/100)+(10/100)+(20/100)=0.07+0.20+0.20+0.03+0.10+0.10+0.10+0.20=1.0

Identify the path depths between the root node 505 and pair each one with the normalized weight of the path's corresponding leaf node 580-594:

{(2, 0.07), (4, 0.2), (4, 0.2), (4, 0.03), (4, 0.1), (5, 0.1), (5, 0.2), (4, 0.1)}

In this example, the above set of ordered pairs is the sensitivity signature of tree 500 and the "size" of tree 500's sensitivity signature is equal to 8, the number of leaf nodes of tree 500. The signature shows, in general terms, a distribution of sensitive data along each path of tree 500, and may represent a first step toward identifying an amount of soft cost required to migrate data represented by each path of tree 500. For example, greater path depths might represent a greater difficulty in isolating and migrating data stored at leaf nodes, and a greater number of leaf nodes may indicate a more complex organization of data represented by tree 500.

Furthermore, each weight value and each depth value of an ordered pair of a sensitivity signature corresponds, respectively, to a relative sensitivity and a relative degree of hotness of one subset of the data comprised by the business element associated with the sensitivity signature.

Step 420 begins a short loop, comprising only step 430, in which the processors compute a "distance" between each pair of sensitivity signatures computed in step 410. At the conclusion of the last iteration of this loop, where distances between every pair of signatures has been computed, the method of FIG. 4 continues with step 440.

In step 430, the processors compute a distance between a pair of sensitivity signatures. The method selected to compute the distance depends upon whether the signatures have been generated in step 400 with normalized or nonnormalized weights.

When sensitivity signatures have been generated with nonnormalized weights, a distance between any two sensitivity signatures may be computed as an "earth mover's distance" (EMD) by means of computations known in the art. See. e.g., Rubner, Y., Tomasi, C., and Guibas, L. J., "The earth mover's distance as a metric for image retrieval," *International Journal of Computer Vision*, 40(2), 99-121 (2000).

Although methods of computing EMD distances have long been known in the art, an example of a EMD computation that might be comprised by an embodiment of the present invention is presented below. In this example, $\gamma_1$ and $\gamma_2$ are sensitivity signatures of a pair of trees constructed in step 400. Each signature is a set of ordered pairs $(z_i^{(j)}, q_1^{(j)})$, where $z_i^{(j)}$ is a path depth of an $j^{th}$ ordered pair of signature $\gamma_i$, and $q_i^{(j)}$ is a weighting of the $j^{th}$ ordered pair of signature $\gamma_i$. In the resulting derivation, $D^2$ is a square of the EMD distance between signature $\gamma_1$ and signature $\gamma_2$, and the distance between the two signatures is defined in terms of an "optimal flow" F (an optimally minimized value of $w_{ij}$), which is derived by means of the equation:

$$\gamma_i = \{(z_i^{(1)}, q_i^{(1)}), (z_i^{(2)}, q_i^{(2)}), \ldots, (z_i^{(m_i)}, q_i^{(m_i)})\}, i = 1, 2.$$

$$W(\gamma_1, \gamma_2, F) = \sum_{i=1}^{m_1} \sum_{j=1}^{m_2} w_{i,j} \|z_1^{(i)} - z_2^{(j)}\|^2$$

subject to

-continued $$\sum_{j=1}^{m_2} w_{i,j} \leq q_1^{(i)}, i = 1, \ldots, m_1;$$

$$\sum_{i=1}^{m_1} w_{i,j} \leq q_2^{(i)}, j = 1, \ldots, m_2;$$

$$\sum_{i=1}^{m_1} \sum_{j=1}^{m_2} w_{i,j} = \min\left(\sum_{i=1}^{m_1} q_1^{(i)}, \sum_{j=1}^{m_2} q_2^{(j)}\right)$$

$$w_{i,j} \geq 0, i = 1, \ldots, m_1, j = 1, \ldots, m_2.$$

One the optimal $w_{i,j}$ is found, the squared distance between $\gamma_1$ and $\gamma_2$ is defined as $$D^2(\gamma_1, \gamma_2) = \frac{\sum_{i=1}^{m_1} \sum_{j=1}^{m_2} w_{i,j}^* \|z_1^{(i)} - z_2^{(j)}\|^2}{\sum_{i=1}^{m_1} \sum_{j=1}^{m_2} w_{i,j}^*}$$

Similarly, when sensitivity signatures have been generated in step 410 with normalized weights, a distance between any two sensitivity signatures may be computed as a Kantorovich-Mallows distance by means of computations known in the art. See, e.g., Mallows, C. L., "A note on asymptotic joint normality," *Annals of Mathematical Statistics*, 43(2), 508-515 (1972). Like the earth mover's distance, a Mallows distance may be derived by means of calculations long known in the art.

As in the previous example, an example of a Mallows-distance computation that might be comprised by an embodiment of the present invention is presented below. Once again, $\gamma_1$ and $\gamma_2$ are sensitivity signatures of a pair of trees constructed in step 400 and $D^2$ is a square of the earth mover's distance between signature $\gamma_1$ and signature $\gamma_2$ as a function of a minimized, optimal, value of $w_{ij}$:

$$D^2(\gamma_1, \gamma_2) = \min_{(w_{i,j})} \sum_{i=1}^{m_1} \sum_{j=1}^{m_2} w_{i,j} \|z_1^{(i)} - z_2^{(j)}\|^2$$

subject to $$\sum_{j=1}^{m_2} w_{i,j} \leq q_1^{(i)}, i = 1, \ldots, m_1;$$

$$\sum_{i=1}^{m_1} w_{i,j} \leq q_2^{(i)}, j = 1, \ldots, m_2;$$

$$\sum_{i=1}^{m_1} \sum_{j=1}^{m_2} w_{i,j} = \sum_{i=1}^{m_1} q_1^{(i)} = \sum_{j=1}^{m_2} q_2^{(j)} = 1$$

$$w_{i,j} \geq 0, i = 1, \ldots, m_1, j = 1, \ldots, m_2.$$

In step 440, the processors organize into clusters the trees created in step 400. This clustering is performed as a function of the distances between pairs of the signatures computed in step 410.

Many distance-based clustering algorithms are known in the art. Embodiments of the present invention may, for example, use agglomerative clustering (also known as "linkage clustering"). See, e.g., A. K. Jain, M. N. Murty, and P. J. Flynn, "Data clustering: a review," *ACM Computing Surveys*, vol. 31(3), pp. 264-323 (1999). Other embodiments might perform this step by means of generalized k-means clustering (or "k-medoids"). See, e.g., T. Hastie, R. Tibshirani, and J. Friedman. "The Elements of Statistical Learning," New York, Springer-Verlag (2001).

In agglomerative clustering, for example, every signature is initially treated as an individual cluster, and pairs of clusters are then merged recursively until a desired total number of clusters is obtained.

In another example, an embodiment that chooses to employ generalized k-means clustering would randomly select k signatures as initial cluster centroids. The remaining signatures are each assigned each signature's closest centroid, with all signatures assigned to the same centroid forming a distinct cluster. The algorithm then identifies, for each cluster, the signature with a smallest total distance to all other signatures in the same cluster. This identified signature becomes the cluster's centroid, and the entire process repeats. The algorithm repeats these steps of cluster assignment and centroid update, ending only when further iterations do not alter the current selection of centroids.

Details of each of these methods are known in the art and are described in great detail in the cited references. If desired by an implementer, an embodiment of the present invention may instead comprise any other distance-based clustering algorithm known in the art. In all cases, however, the centroid of a cluster is defined as the signature with the smallest total distance to all the other signatures in the cluster. A total distance of any signature in a cluster may be straightforwardly computed by adding the previously computed distances between that signature and every other signature in the cluster.

A benchmark migration cost is then associated with each centroid signature by means known in the art or by means of expert knowledge possessed by a person familiar with the business migrating the data. This benchmark cost may be a standardized cost, stored as a file or communicated to the system interactively, and determined as a function of known costs incurred when migrating similar volumes. In other embodiments, each benchmark cost may be determined by an implementer or operator by reviewing a software or hardware vendor's published estimate of migration costs, by creating and referring to a relative scale or method of estimating costs as a function of complexity, hotness, sensitivity, regulatory constraints, by adopting industry conventions or standard estimates of soft costs associated with specific types of migrations, or by means of other considerations that the implementer or operator believes may affect soft migration costs. The present invention is flexible enough to operate properly regardless of which method a user prefers to use when selecting these benchmark costs.

Once a centroid signature of a cluster is associated with a benchmark migration cost, that cost is then associated with every other business element represented by a signature in the same cluster. In this way, a business need identify only one cost per cluster, a process that may be performed automatically.

Figure 6:
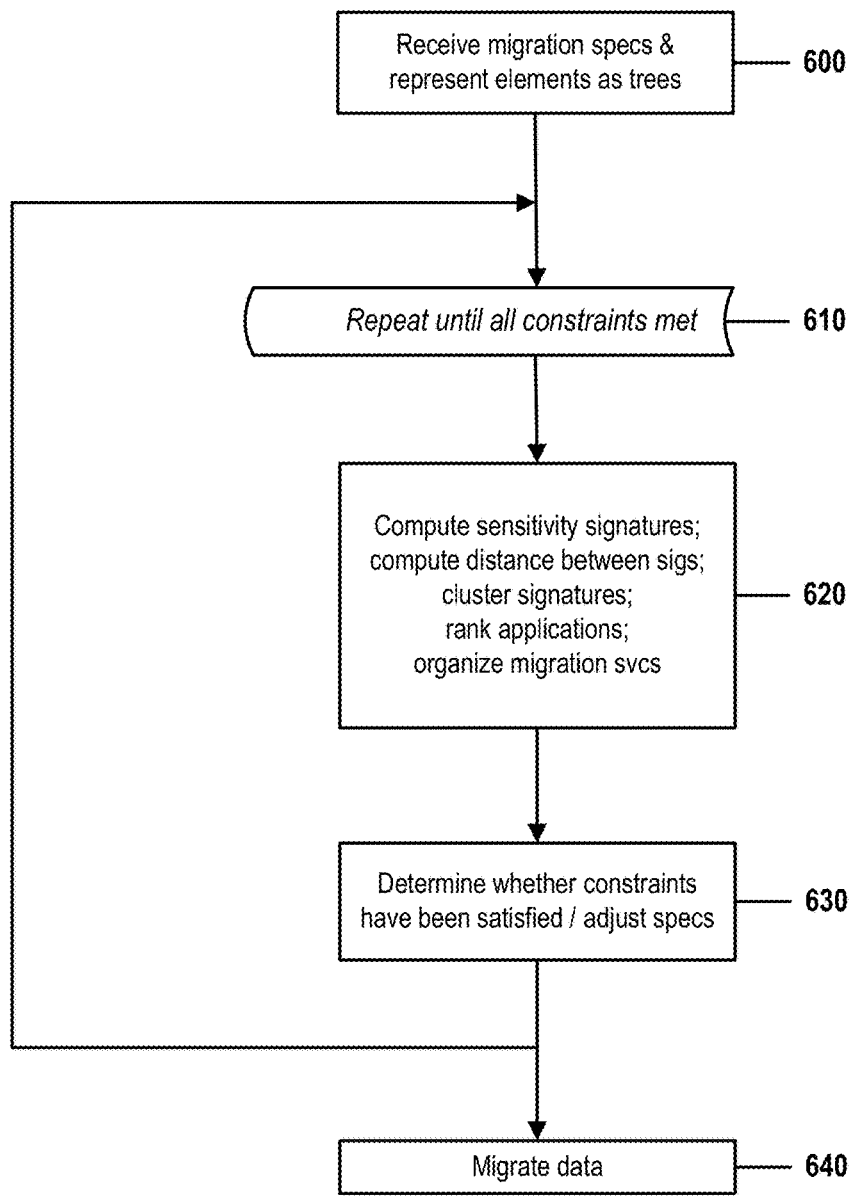
FIG. 6 is a flow chart that illustrates steps of a second embodiment of a method for optimized orchestration of data-migration projects with soft migration costs based on file-specific migration feasibilities, in accordance with embodiments of the present invention.
Figure 7:
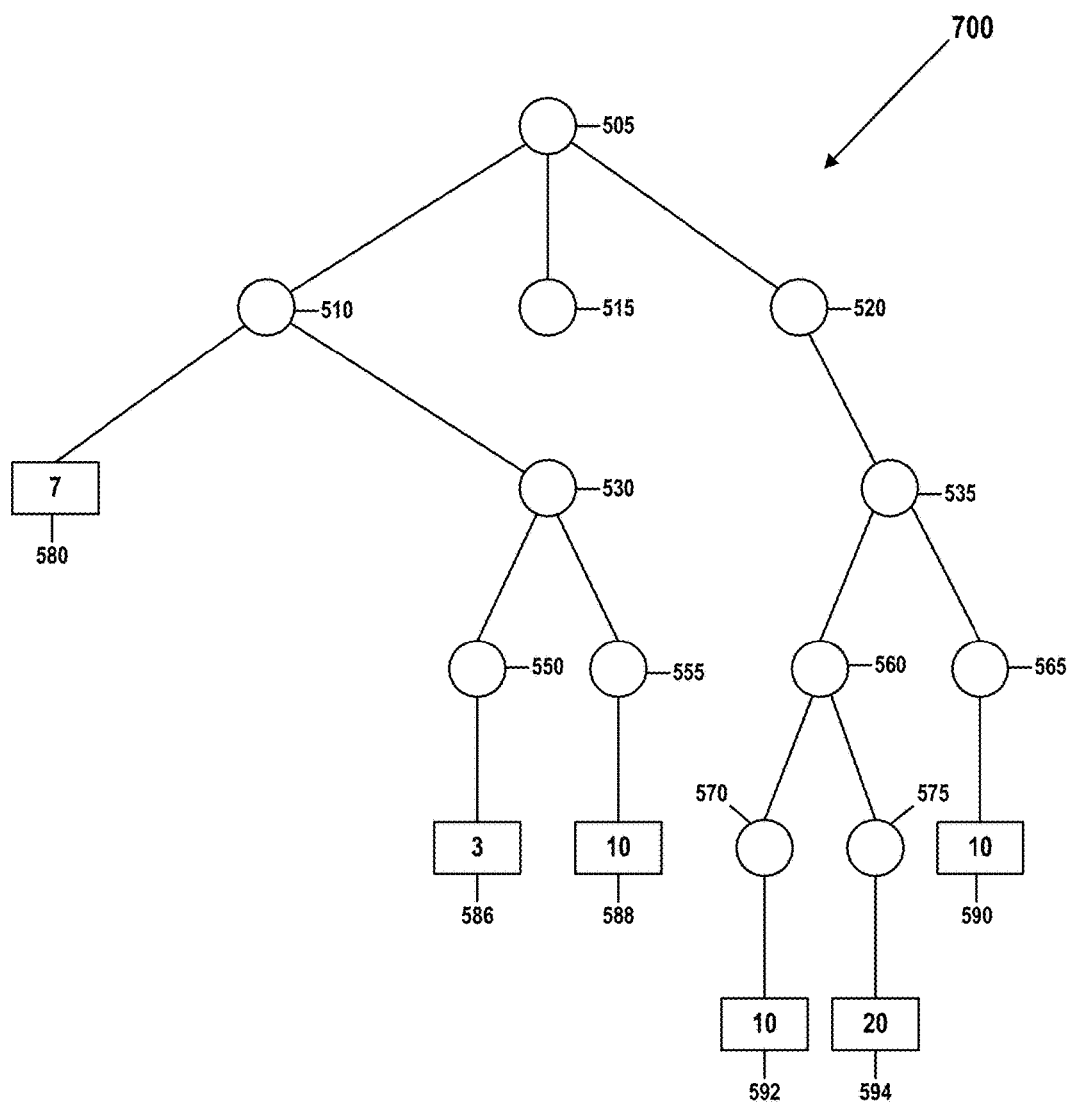
FIG. 7 shows an example of a hierarchical data structure constructed by the embodiment of the present invention illustrated in FIG. 6.

In some embodiments of the present invention, determining an accurate estimate of each centroid's benchmark cost may not be critical if those embodiments employ an iterative, optimizing procedure to fine-tune the final cost estimates produced by the embodiment. In such cases, each iteration will increase the accuracy of the benchmark values, eventually resulting in a set of benchmark costs that may be used to assign costs to centroid signatures identified during future performances of a method of the present invention. Such an embodiment is illustrated in FIGS. 6 and 7.

In step 450, the applications or other entities to be migrated are ordered as a function of total migration soft costs associated with the data associated with each migrating application or other entity. Here, a migrating entity might comprise one or more software applications, business units, storage locations, computing sites, cloud services, cloud-computing platforms, or other entities that can be migrated only when associated data is likewise migrated. For example, it may be possible to migrate a transaction-processing application to a cloud platform only if 1,000 volumes of user-transaction data are also migrated to the same cloud. In other examples, data associated with an application or other entity may be a combination of the business elements represented by any number of the trees constructed in step 400.

Total migration soft costs of a particular application or entity may be straightforwardly calculated by summing benchmark costs of each business element associated with that application or entity. If, for example, a business element is represented by a first tree, and if the sensitivity signature of that first tree is organized into a cluster that has a first centroid, a benchmark cost of that business element is the soft migration cost of the first centroid.

In the previous example, if the transaction-processing application's 1,000 volumes were associated with 1,500 sensitivity signatures (each of which is associated with one cluster), the total migration soft costs associated with migrating data required by the application would be the sum of 1,500 costs of the 1,500 centroids of the clusters associated with each of the 1,000 volumes. If more than one volume belongs to the same cluster, the cost of that cluster's centroid would be added once for each volume. If one volume spans more than one cluster, then the total cost would include centroid costs of every cluster associated with that one volume.

At the conclusion of step 450, each application or other migrating entity would be associated with a raw number, computed by the above procedures, that identifies a relative soft cost to migrate data associated with that application. These raw numbers may be used to rank the migrating applications or entities by data-migration cost, where the data-migration cost has been automatically adjusted to account for soft costs and feasibility issues.

In step 460, the processors use the rankings identified in step 450 to identify which applications or other entities may be most difficult, time-consuming, or costly to migrate. In some embodiments, a migration project manager or automated migration-orchestration system may then use this information to flag potential bottlenecks in a planned migration project. In other embodiments, this information may allow an orchestration mechanism to sequence the migration of each application or other migrating entity such that the most straightforward, least-costly applications or entities are migrated first. If desired by the implementer, this information may also be used to identify potentially troublesome data-migration tasks that must be managed manually, leaving less costly data-migrations to be performed by an automated orchestration mechanism.

In step 470, the processors of the migration-orchestration system perform the actual data migration by means of computer software or code 307, storage controllers or other interfaces 309, and associated middleware required to migrate data stored on a first set of storage devices 311 to a second set of storage devices 311. The sequence in which data associated with each application or other entity is migrated is determined by the ranking performed in step 450. As described above, some embodiments may migrate data in the order of least costly to most costly. Other embodiments may migrate all data that does not exceed a preset cost threshold selected by a business or other user as a function of the business's internal policies and procedures. A common denominator to all embodiments is that the sequence of data migrations be ordered in a manner that takes into consideration the relative cost rankings of step 450.

FIG. 6 is a flow chart that illustrates steps of a second embodiment of a method for optimized orchestration of data-migration projects with soft migration costs based on file-specific migration feasibilities, in accordance with embodiments of the present invention. FIG. 6 contains steps 600-640.

In step 600, much like step 400 of FIG. 4, a processor of a migration-orchestration system receives specifications of a data-migration project of the business and, in response, the orchestration system generates a set of hierarchical tree diagrams that each represents a business element to be migrated.

Unlike step 400, however, the received specifications may include certain user-defined constraints, such as a requirement that at least part of a certain business element must be migrated or that a certain business element must be migrated within a certain time frame. These constraints may be defined at will by a business, an implementer, or a user in order to satisfy business policies, hardware limitations, regulatory or statutory restrictions, or any other factors that the user might consider important enough to warrant inclusion.

Step 610 begins a short iterative procedure of steps 610-630, which comprise functionality similar to that of steps 410-460 of FIG. 4. At the conclusion of the last iteration of this procedure, the method of FIG. 6 continues with step 640.

As in the corresponding steps of FIG. 4, the processors in step 620 compute a sensitivity signature for each tree constructed in step 600, compute a distance between each pair of sensitivity signatures computed in step 610, organize the signatures into clusters as a function of their inter-signature distances, identify a centroid signature for each cluster, and associate a benchmark cost with each business element associated with a centroid signature. The processors then identify soft costs for each application, rank the applications by their costs, and use the rankings to determine which applications may be most difficult, time-consuming, or costly to migrate.

In step 630, the processors determine whether the current ranking allows all user-defined constraints received in step 600 to be met. Consider, for example, a case in which the processors received a first constraint in step 600 requiring a first application to be migrated and received a second constraint requiring that no application incurs soft migration costs that exceed a certain threshold value. If the processors in step 630 determine that soft migration costs for the first application exceed the threshold value, then the processors in this step will adjust the specifications received in step 600 and then perform another iteration of the procedure of steps 610-630.

This adjustment may be performed automatically, by any means known in the art, such as by means of a software module that applies predefined solutions to common problems, by means of artificial intelligence or machine learning, by examining historical records of prior attempts to resolve similar problems, or by means of an interactive session with an operator.

Consider, for example, a case in which data associated with the first application is represented by the tree shown in FIG. 5. One possible way to lower the migration cost of the first application might be to reduce the amount of sensitive data associated with the first application. This may be accomplished by removing node 525 (and any descendant nodes of node 525) from tree 500. Such an adjustment would reduce by 40%. the amount of first-application sensitive data to be moved. This deletion may be deemed to be an acceptable adjustment for a variety of reasons, such as the age of the data, or the depth of the path between root node 505 and the leaf nodes 582 and 584 associated with node 525.

In other embodiments, an implementer or user may prefer to reclassify certain data as being sensitive or nonsensitive, may sanitize a business element by eliminating sensitive data, leaving only easier-to-migrate nonsensitive data, may split or combine business elements, or may perform any other adjustment to the received specifications deemed appropriate by the implementer or user. Embodiments of the present invention may provide implementers significant flexibility in selecting such resolutions for specific types of constraint violations.

FIG. 7 shows a tree 700 that results from deleting node 525 from tree 500. Here, items 505-594 are similar in form and function to numerically corresponding items of FIG. 5. Because of the deletion of node 525 (and its descendant nodes 540, 545, 582, and 584), migrating data represented by tree 700 requires migration of only 60% as much sensitive data as would migrating the data represented by tree 500.

Many other types of adjustments may be made within the scope of the present invention, as desired by implementers and users, including an adjustment to remove or modify a constraint comprised by the specifications received in step 600. Such an adjustment might be performed if, for example, there is no other acceptable way to reconcile two conflicting constraints.

If the processors in step 630 determine that a failure to satisfy a constraint received in step 600 has resulted in an adjustment to the specifications received in step 600, then the procedure of steps 610-630 repeats for another iteration. Here, the processors in step 630 use the adjusted specifications to determine new sets of signatures, clusters, centroids, centroid benchmark costs, and application soft migration costs, and rank migrating applications by their associated costs. The processors then determine whether any constraints received in step 600 have been violated and, if so, whether the specifications should be further adjusted. Necessary adjustments are made, but if no adjustments are considered necessary, the method of FIG. 6 continues with step 640.

Step 640 is similar in operation to step 470 of FIG. 4.

In step 630, the processors use the rankings identified in step 620 to identify which applications or other entities may be most difficult, time-consuming, or costly to migrate. In some embodiments, a migration project manager or automated migration-orchestration system may then use this information to flag potential bottlenecks in a planned migration project. In other embodiments, this information may allow an orchestration mechanism to sequence the migration of each application or other migrating entity such that the most straightforward, least-costly applications or entities are migrated first. If desired by the implementer, this information may also be used to identify potentially troublesome data-migration tasks that must be managed manually, leaving less costly data-migrations to be performed by an automated orchestration mechanism.

In step 670, the processors of the migration-orchestration system perform the actual data migration by means of computer software or code 307, storage controllers or other interfaces 309, and associated middleware required to migrate data stored on a first set of storage devices 311 to a second set of storage devices 311. The sequence in which data associated with each application or other entity is migrated is determined by the ranking performed in step 650. As described above, some embodiments may migrate data in the order of least costly to most costly. Other embodiments may migrate all data that does not exceed a preset cost threshold selected by a business or other user as a function of the business's internal policies and procedures. A common denominator to all embodiments is that the sequence of data migrations be ordered in a manner that takes into consideration the relative cost rankings of step 650.

What is claimed is:

1. A data-migration orchestration system comprising a processor, a memory coupled to the processor, one or more storage-management mechanisms capable of migrating data from a source computing environment to a target computing environment, and a local computer-readable hardware storage device coupled to the processor, the local storage device containing program code configured to be run by the processor via the memory to implement a method for optimized orchestration of a data-migration project, the method comprising:

constructing a set of weighted tree structures that each represent a dataset of a set of stored datasets capable of being migrated by the one or more storage-management mechanisms from the source computing environment to the target computing environment, where each application of a set of applications to be migrated requires data comprised by a corresponding subset of the set of datasets, where a first application of the set of applications requires data comprised by a first subset of the set of datasets, where a first dataset of the first subset is represented by a root node of a first tree of the set of weighted tree structures, where a first internal node of the first tree represents a first data folder comprised by the first dataset and a child node of the first internal node represents a second data folder comprised by the first data folder, where a first leaf node of the first tree is associated with a first weight that is proportional to a first quantity of sensitive data represented by the first leaf node, and where the first leaf node is associated further with a first path depth that is proportional to a length of a path from the root node to the first leaf node;

identifying a sensitivity signature for each tree of the set of weighted tree structures, where a first sensitivity signature of the first tree comprises a set of ordered pairs that each uniquely characterize a corresponding leaf node of the first tree, and where a first ordered pair of the first sensitivity signature characterizes the first leaf node and comprises the first weight and the first path depth;

computing a distance between each pair of identified sensitivity signatures;

grouping the computed sensitivity signatures into a set of clusters as a function of the determined distances;

associating each cluster of the set of clusters with a centroid sensitivity signature;

calculating a soft data-migration cost for the first application as a function of all sensitivity signatures associated with the first subset of the set of datasets, and migrating, by the one or more storage-management mechanisms, datasets of the set of datasets from the source computing environment to the target computing environment in order of increasing soft data-migration costs calculated for each dataset.

2. The system of claim 1, where each non-leaf node of the first tree represents a storage location, such that the first path represents a hierarchical pathname of data represented by the first leaf node.

3. The system of claim 1, where a distance between two sensitivity signatures is an Earth Mover's Distance between the two sensitivity signatures.

4. The system of claim 1, where the weights of all leaf nodes of all trees of the set of weighted tree structures have been normalized such that the sum of all weights associated with any one tree equals a value of 1, and where a distance between two sensitivity signatures is a Kantorovich-Mallows distance between the two sensitivity signatures.

5. The system of claim 1, where the grouping the computed sensitivity signatures and the associating each cluster with a centroid sensitivity signature are performed by a method selected from the group consisting of agglomerative clustering and generalized k-means clustering.

6. The system of claim 1, where the first quantity of sensitive data is proportional to a number of sensitive data files represented by the first leaf node.

7. The system of claim 1, where the first quantity of sensitive data is proportional to an amount of storage space required to store the sensitive data represented by the first leaf node.

8. The system of claim 1, where the target computing environment is a cloud-computing environment.

9. A method for optimized orchestration of a data-migration project, the method comprising:

constructing a set of weighted tree structures that each represent a dataset of a set of stored datasets capable of being migrated by one or more storage-management mechanisms from a source computing environment to a target computing environment, where each application of a set of applications to be migrated requires data comprised by a corresponding subset of the set of datasets, where a first application of the set of applications requires data comprised by a first subset of the set of datasets, where a first dataset of the first subset is represented by a root node of a first tree of the set of weighted tree structures, where a first internal node of the first tree represents a first data folder comprised by the first dataset and a child node of the first internal node represents a second data folder comprised by the first data folder, where a first leaf node of the first tree is associated with a first weight that is proportional to a first quantity of sensitive data represented by the first leaf node, and where the first leaf node is associated further with a first path depth that is proportional to a length of a path from the root node to the first leaf node;

identifying a sensitivity signature for each tree of the set of weighted tree structures, where a first sensitivity signature of the first tree comprises a set of ordered pairs that each uniquely characterize a corresponding leaf node of the first tree, and where a first ordered pair of the first sensitivity signature characterizes the first leaf node and comprises the first weight and the first path depth;

computing a distance between each pair of identified sensitivity signatures;

grouping the computed sensitivity signatures into a set of clusters as a function of the determined distances;

associating each cluster of the set of clusters with a centroid sensitivity signature;

calculating a soft data-migration cost for the first application as a function of all sensitivity signatures associated with the first subset of the set of datasets; and migrating, by the one or more storage-management mechanisms, datasets of the set of datasets from the source computing environment to the target computing environment in order of increasing soft data-migration costs calculated for each dataset.

10. The method of claim 9, where a distance between two sensitivity signatures is an Earth Mover's Distance between the two sensitivity signatures.

11. The method of claim 9, where the weights of all leaf nodes of all trees of the set of weighted tree structures have been normalized such that the sum of all weights associated with any one tree equals a value of 1, and where a distance between two sensitivity signatures is a Kantorovich-Mallows distance between the two sensitivity signatures.

12. The method of claim 9, where the grouping the computed sensitivity signatures and the associating each cluster with a centroid sensitivity signature are performed by a method selected from the group consisting of agglomerative clustering and generalized k-means clustering.

13. The method of claim 9, where the first quantity of sensitive data is proportional to a number of sensitive data files represented by the first leaf node.

14. The method of claim 9, further comprising providing at least one support service for at least one of creating, integrating, hosting, maintaining, and deploying computer-readable program code in the computer system, wherein the computer-readable program code in combination with the computer system is configured to implement the constructing, the identifying, the computing, the grouping, the associating, the calculating, and the migrating.

15. A computer program product, comprising a computer-readable hardware storage device having a computer-readable program code stored therein, the program code configured to be executed by a migration-orchestration system comprising a processor, a memory coupled to the processor, and a computer-readable hardware storage device coupled to the processor, the storage device containing program code configured to be run by the processor via the memory to implement a method for optimized orchestration of a data-migration project, the method comprising:

constructing a set of weighted tree structures that each represent a dataset of a set of stored datasets capable of being migrated by one or more storage-management mechanisms from a source computing environment to a target computing environment, where each application of a set of applications to be migrated requires data comprised by a corresponding subset of the set of datasets, where a first application of the set of applications requires data comprised by a first subset of the set of datasets, where a first dataset of the first subset is represented by a root node of a first tree of the set of weighted tree structures, where a first internal node of the first tree represents a first data folder comprised by the first dataset and a child node of the first internal node represents a second data folder comprised by the first data folder, where a first leaf node of the first tree is associated with a first weight that is proportional to a first quantity of sensitive data represented by the first leaf node, and where the first leaf node is associated further with a first path depth that is proportional to a length of a path from the root node to the first leaf node;

identifying a sensitivity signature for each tree of the set of weighted tree structures, where a first sensitivity signature of the first tree comprises a set of ordered pairs that each uniquely characterize a corresponding leaf node of the first tree, and where a first ordered pair of the first sensitivity signature characterizes the first leaf node and comprises the first weight and the first path depth;

computing a distance between each pair of identified sensitivity signatures;

grouping the computed sensitivity signatures into a set of clusters as a function of the determined distances;

associating each cluster of the set of clusters with a centroid sensitivity signature;

calculating a soft data-migration cost for the first application as a function of all sensitivity signatures associated with the first subset of the set of datasets; and migrating, by the one or more storage-management mechanisms, datasets of the set of datasets from the source computing environment to the target computing environment in order of increasing soft data-migration costs calculated for each dataset.

16. The computer program product of claim 15, where a distance between two sensitivity signatures is an Earth Mover's Distance between the two sensitivity signatures.

17. The computer program product of claim 15, where the weights of all leaf nodes of all trees of the set of weighted tree structures have been normalized such that the sum of all weights associated with any one tree equals a value of 1, and where a distance between two sensitivity signatures is a Kantorovich-Mallows distance between the two sensitivity signatures.

18. The computer program product of claim 15, where the grouping the computed sensitivity signatures and the associating each cluster with a centroid sensitivity signature are performed by a method selected from the group consisting of agglomerative clustering and generalized k-means clustering.

19. The computer program product of claim 15, where the first quantity of sensitive data is proportional to a number of sensitive data files represented by the first leaf node.

* * * * *